US009652690B2

(12) United States Patent
Eid et al.

(10) Patent No.: US 9,652,690 B2
(45) Date of Patent: May 16, 2017

(54) AUTOMATICALLY CAPTURING AND CROPPING IMAGE OF CHECK FROM VIDEO SEQUENCE FOR BANKING OR OTHER COMPUTING APPLICATION

(71) Applicant: LEXMARK INTERNATIONAL, INC., Lexington, KY (US)

(72) Inventors: Ahmed Hamad Mohamed Eid, Lexington, KY (US); Tomasz Jan Cholewo, Lexington, KY (US); Stuart Willard Daniel, Lexington, KY (US); Stacy Lee Simpson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 110 days.

(21) Appl. No.: 14/633,955

(22) Filed: Feb. 27, 2015

(65) Prior Publication Data
US 2016/0253573 A1 Sep. 1, 2016

(51) Int. Cl.
*G06K 9/62* (2006.01)
*G06T 3/40* (2006.01)
(Continued)

(52) U.S. Cl.
CPC ......... *G06K 9/6202* (2013.01); *G06Q 20/042* (2013.01); *G06Q 20/0425* (2013.01);
(Continued)

(58) Field of Classification Search
CPC .. G06K 9/6202; G06Q 20/042; G06Q 20/108; G06T 1/0007; G06T 3/403; G06T 3/60; G06T 7/0085
See application file for complete search history.

(56) References Cited

U.S. PATENT DOCUMENTS 5,559,898 A * 9/1996 Avi-Itzhak ........... G06K 9/6202
382/209
6,547,132 B1 * 4/2003 Templeton ........... G06K 7/0004
235/379
(Continued)

OTHER PUBLICATIONS

Narvekar, N.D.; Karam, L.J., "A No-Reference Image Blur Metric Based on the Cumulative Probability of Blur Detection (CPBD)," Image Processing, IEEE Transactions on, vol. 20, No. 9, pp. 2678-2683, Sep. 2001.
(Continued)

*Primary Examiner* — Kim Vu
*Assistant Examiner* — Pinalben Patel

(57) ABSTRACT

A mobile device with camera automatically captures an image of a check from a video sequence. A computing application assesses quality metrics of a frame of the video and, if acceptable, initiates capture of the check in that frame without user selection. Metrics include an aspect ratio of the check, image quality of the routing transit symbols that delineate a routing transit number on a MICR line of the check, distances between the routing transit symbols and to an edge of the check, recognition of digits of the routing transit number, checksum of the routing transit numbers, and image sharpness. Other embodiments note cropping of the check from the background of the image, properly orienting the check for viewing, and providing color coded visual feedback to users about the quality of the image frame about the check, to name a few.

16 Claims, 10 Drawing Sheets

(51) Int. Cl.
   *G06Q 20/10* (2012.01)
   *G06T 7/00* (2017.01)
   *G06Q 20/04* (2012.01)
   *G06T 1/00* (2006.01)
   *G06T 3/60* (2006.01)
   *G06T 3/00* (2006.01)
   *G06T 7/13* (2017.01)

(52) U.S. Cl.
   CPC ............ *G06Q 20/108* (2013.01); *G06T 3/00* (2013.01); *G06T 7/13* (2017.01); *G06K 2209/01* (2013.01); *G06T 2207/10016* (2013.01); *G06T 2207/20132* (2013.01); *G06T 2207/30176* (2013.01)

(56) References Cited

U.S. PATENT DOCUMENTS

| | | | | |
|---|---|---|---|---|
| 6,760,470 B1* | 7/2004 | Bogosian | ............... | G06K 9/186 235/380 |
| 7,962,411 B1* | 6/2011 | Prasad | ................... | G06Q 20/00 235/379 |
| 8,023,741 B2* | 9/2011 | Ferman | ................. | G06K 9/325 382/140 |
| 8,155,425 B1* | 4/2012 | Mandel | ................ | G06K 9/2063 382/100 |
| 8,351,678 B1* | 1/2013 | Medina, III | ........... | G06Q 20/00 235/379 |
| 8,401,268 B1* | 3/2013 | Yacoubian | ......... | G07D 11/0084 235/379 |
| 8,452,689 B1* | 5/2013 | Medina, III | ......... | G06Q 20/042 705/36 R |
| 8,577,118 B2 | 11/2013 | Nepomniachtchi | | |
| 8,699,779 B1 | 4/2014 | Prasad | | |
| 8,768,038 B1 | 7/2014 | Sherman | | |
| 8,977,571 B1* | 3/2015 | Bueche, Jr. | ............ | G06Q 40/02 705/44 |
| 9,355,421 B2* | 5/2016 | Beaver, III | ............. | G06T 19/00 |
| 9,449,239 B2* | 9/2016 | Dixon | ................... | G06K 9/186 |
| 2005/0071283 A1* | 3/2005 | Randle | .................. | G06Q 20/04 705/75 |
| 2006/0045321 A1* | 3/2006 | Yu | ....................... | G06K 9/3216 382/137 |
| 2007/0183000 A1* | 8/2007 | Eisen | ................ | H04N 1/00864 358/452 |
| 2009/0043677 A1* | 2/2009 | DeYoe | ................ | G06Q 20/108 705/30 |
| 2009/0185738 A1* | 7/2009 | Nepomniachtchi | ...... | G06K 9/36 382/140 |
| 2010/0082470 A1 | 4/2010 | Walach | | |
| 2011/0280450 A1* | 11/2011 | Nepomniachtchi | ...... | G06K 9/32 382/112 |
| 2012/0113489 A1* | 5/2012 | Heit | ....................... | G06K 9/186 358/518 |
| 2012/0170829 A1* | 7/2012 | Jackson | .................... | G06K 9/72 382/140 |
| 2012/0263352 A1* | 10/2012 | Fan | ....................... | G06K 9/3258 382/105 |
| 2012/0284081 A1* | 11/2012 | Cheng et al. | .......... | G06Q 30/02 705/7.29 |
| 2013/0022231 A1* | 1/2013 | Nepomniachtchi | .. | G06Q 20/042 382/102 |
| 2013/0124414 A1* | 5/2013 | Roach | .................... | G06Q 20/10 705/44 |
| 2014/0032406 A1* | 1/2014 | Roach | ................... | G06Q 20/042 705/42 |
| 2014/0072201 A1* | 3/2014 | Tilt | .................... | H04N 5/23293 382/140 |
| 2015/0120563 A1* | 4/2015 | Smith | .................. | G06Q 20/042 705/45 |
| 2016/0125613 A1* | 5/2016 | Shustorovich | ..... | G06K 9/00463 382/140 |

OTHER PUBLICATIONS

Mitek Systems; miteksystems.com; http://www.miteksystems.com/solutions/technology/misnap; Mitek MiSnap SDK brochure; printed Feb. 4, 2015; 3 pp.

Wikipedia; http://en.wikipedia.org/wiki/Routing_transit_number#Routing_symbol; "Routing Transit Number"; printed Jan. 30, 2015; 14 pp.

Morovia Corporation; morovia.com; http://www.morovia.com/manuals/micr4/ch03.php; "3 MICR Line Placement Guide"; printed Jan. 30, 2015; 2 pp.

* cited by examiner

AUTOMATICALLY CAPTURING AND CROPPING IMAGE OF CHECK FROM VIDEO SEQUENCE FOR BANKING OR OTHER COMPUTING APPLICATION

FIELD OF THE EMBODIMENTS

The present disclosure relates to image capture with cameras of mobile computing devices, such as smart phones and tablets. It relates further to mobile capture of checks for banking or other computing applications. Automatic capture and cropping of the image of the check from a video sequence typifies the embodiments.

BACKGROUND

Banking and other financial institutions have recently allowed the transfer and depositing of funds from check by way of mobile capture from cameras of mobile devices. Users install a proprietary banking application on their mobile device. They open the application and initiate capture by selecting a button such as "check deposit," "deposit funds," or the like. The mobile device turns on the camera and users focus the field-of-view on the check. When users believe the image of the check on their display shows sufficient quality, they manually select capture of the image by depressing a camera icon or other button to take a picture.

Unfortunately, users sometimes angle their device poorly relative to the check and/or shake it while manually activating the camera button. It results in distorted or blurry images insufficient for banking requirements and users must re-take their pictures. Some applications also burden users to manually enter data from the check, such as typing numbers into the application from the magnetic ink character recognition (MICR) line of the check. In other applications, users focus their camera on items for mobile capture, such as a driver's license, and the camera automatically takes a picture whenever the user steadies the image. Nothing, however, allows discrimination between items such as knowing a difference between licenses and checks and users must provide items for capture at proper times when the application calls for them.

A need exists in the art to better capture images of checks with mobile devices, including automatic capture. Since third parties often supply software development kits (SDKs) to financial institutions for them to create their own banking applications, the need extends to better capture techniques in SDKs. Further needs also contemplate instructions or software executable on controller(s) in mobile devices for reliably performing the same. Additional benefits and alternatives are sought when devising solutions.

SUMMARY

The above-mentioned and other problems are solved by methods and apparatus for automatic capture and crop of a check image from a video sequence. The techniques are typified for use in banking applications on mobile devices for transfer and deposit of funds from the check. SDKs provided to banking or financial institutions are useful in creating the banking applications that users download onto their mobile device for mobile capture.

In a representative embodiment, a mobile device with camera automatically captures an image of a check from a video sequence. A computing application assesses quality metrics of a frame of the video and, if acceptable, initiates capture of the check in that frame without user selection. Metrics include an aspect ratio of the check, image quality of the routing transit symbols that delineate a routing transit number on a MICR line of the check, distances and ratios between the routing transit symbols and to an edge of the check, recognition of digits of the routing transit number as determined by comparison to templates of digits and selecting best matches, checksum of the routing transit numbers, and image sharpness. Other embodiments note cropping of the check from the background of the image to reduce file size, properly orienting the check for viewing, and providing color-coded visual feedback to users about the quality of the image frame about the check, to name a few.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach automatic capture and crop of a check image from a video sequence for banking or other computing applications.

Figure 1:
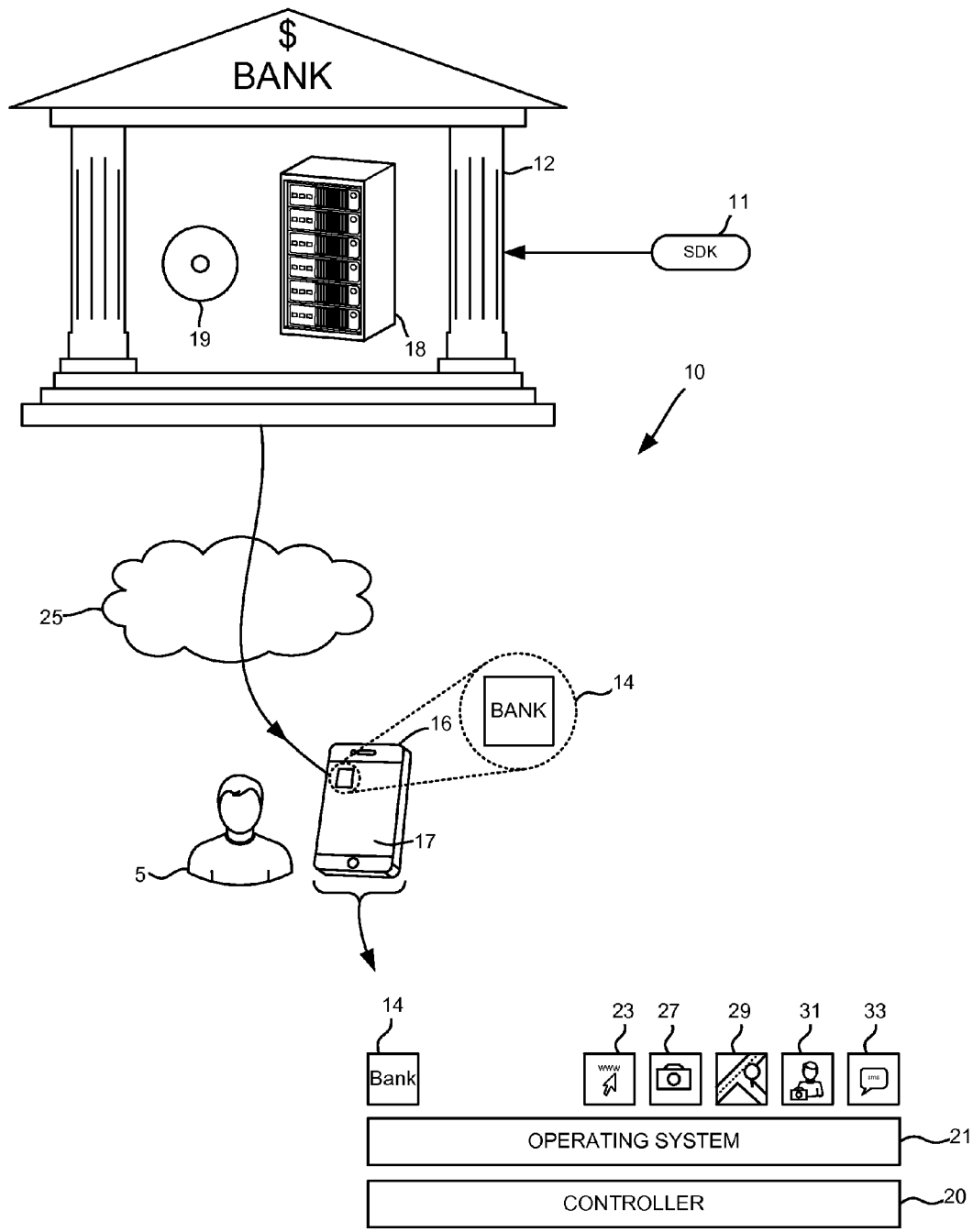
FIG. 1 is a diagram of a computing system environment for a computing application on a mobile device.

With reference to FIG. 1, users 5 install a computing application 14 on their mobile computing device 16, e.g., smart phone, tablet, etc. They download the application in a computing system environment 10 from a service provider 12 of mobile applications, such as a financial institution or bank, in this instance. The download resides as executable code on a computing device 18 such as a server or imprinted on a computer readable medium 19 such as a CD, smart card, USB stick, etc. Users retrieve the medium and load the application directly onto their mobile device or with assistance from still another computing device (not shown). Alternatively, users execute a series of functions on their mobile device and obtain the requisite code by way of an attendant computing network 25. The network includes or not a variety of software such as an "app store" and hardware such as routers, servers, switches, desktop/laptop computers, phone transmission towers, satellites, etc. The connections typify wired and wireless communications between a few or many devices in an internet, intranet or other environment. Skilled artisans readily understand the process and the requisite actions for downloading applications. The application or portions thereof may be first provided to the bank as a software development kit (SDK) 11 from a third party, such as those developing automatic capture and crop features from a video sequence. The bank then bundles together features of the SDK into the application for download by the users.

During successful installation of the application 14, the mobile computing device 16 hosts it on one or more controllers 20 resident in a housing 15. The controller(s) also host an operating system 21 and one or more additional mobile applications or features, as is typical. The additional items also have functionality that can be accessed, opened or otherwise utilized by the computing application 14. These include, for example, a web browser 23, camera 27, map or GPS device 29, photo album 31, and SMS 33. Their functionality is known in the art.

Figure 2:
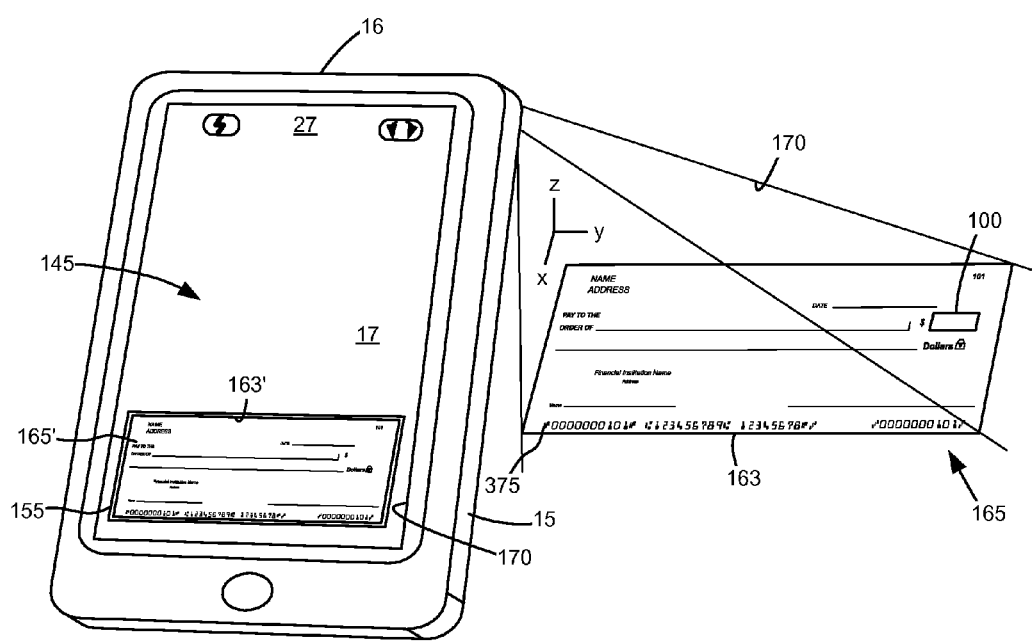
FIG. 2 is a diagram of a mobile device and camera capturing and cropping an image of a check from a video sequence.

With reference to FIG. 2, users seek to deposit or transfer funds in an amount 100 corresponding to a check 165. Execution of the computing application 14 in mobile device 16 activates the function of the camera 27 when attempting to capture an image of the check. Users manipulate the housing 15 of the mobile device so the field of view 170 of the camera is maneuvered to take-in the entirety of the check boundary 163 for viewing on a display 17 of the mobile device. The application 14 causes the camera to capture the image 165' of the check upon achieving a predetermined quality, as described below. The image 165' of the check is also cropped 155 from background images 145 showing up in the field of view. The image of the check is also rotated for proper viewing, if not already oriented as users read the check from left-to-right.

Figure 3A:
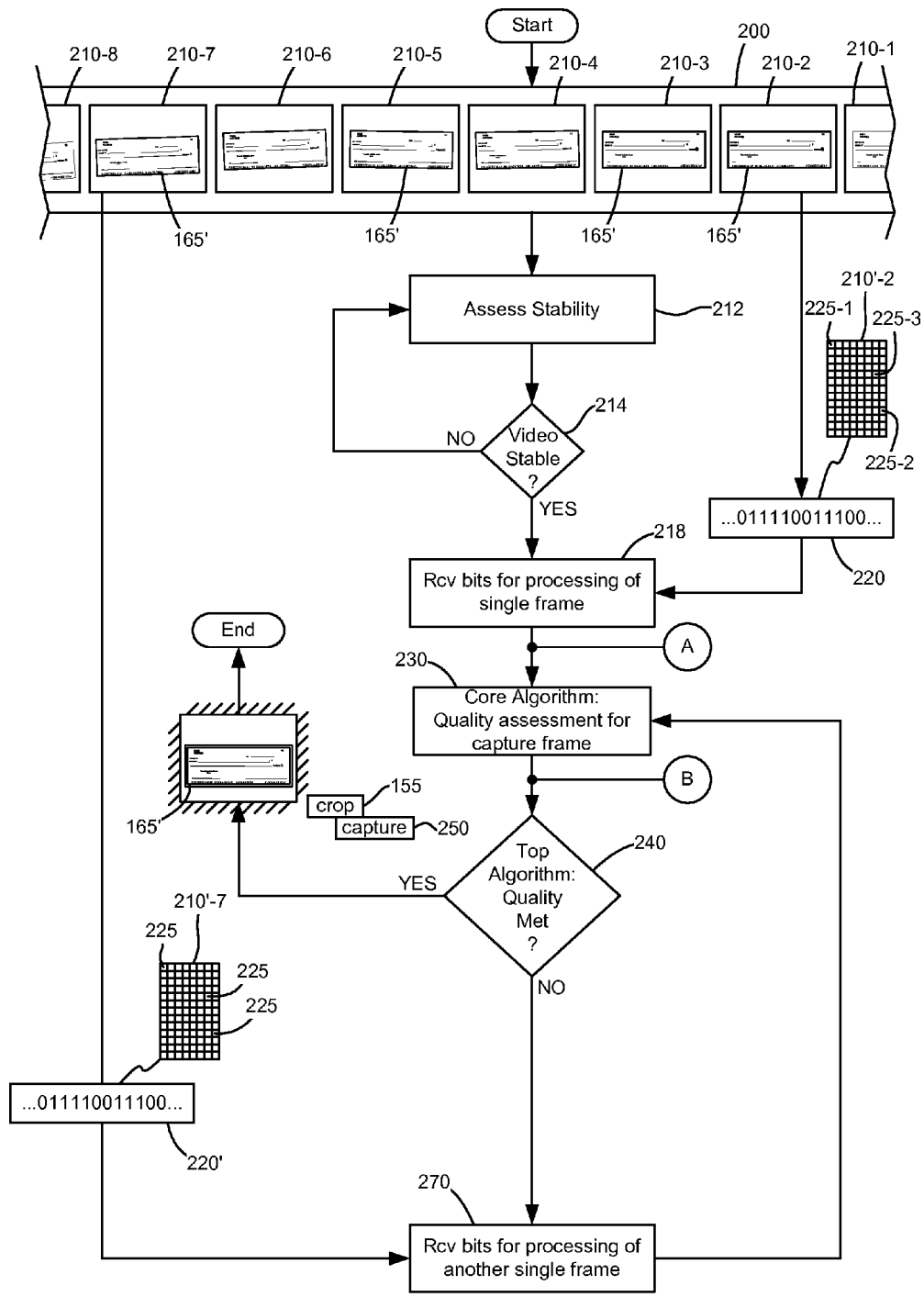
FIGS. 3A and 3B are flow charts for assessing quality of an image for automatic capture and crop of an image of a check from a video sequence, without user intervention.

With reference to FIG. 3A, the camera function of the mobile device creates a video sequence 200 comprised of pluralities of discrete frames 210-1, -2, -3, . . . etc., as is known. Each frame 210 includes an image 165' of the check. The controller of the mobile device assesses the stability of the video sequence at 212 to see if the user is shaking the housing of device too much to capture a quality image of the check, for example. The controller checks values coming to it from the accelerometer (not shown) of the mobile device. These values indicate movement of the housing. They can be evaluated by the controller as often or infrequently as desired. If the video sequence is too unstable at 214, the controller continually evaluates the video until it becomes stable or perhaps times out, such as with the closing of the application 14. On the other hand, if the video is indeed stable enough to process the image of the check, the controller receives 218 the requisite bits 220 it needs to assess the quality of a single frame 210 of the video (frame 210-2, in this instance). In turn, the bits correspond to pixel values 225-1, -2, -3, etc. of a single frame of the video. The pixel values may be either on or off, binary, or represent a value, such as 0-255, in gray scale. The pixels may also define one or more colors of a multi-color plane image (red, green, blue, or Y, Cb, Cr, etc.) that combine together to form a complete image.

Figure 3B:
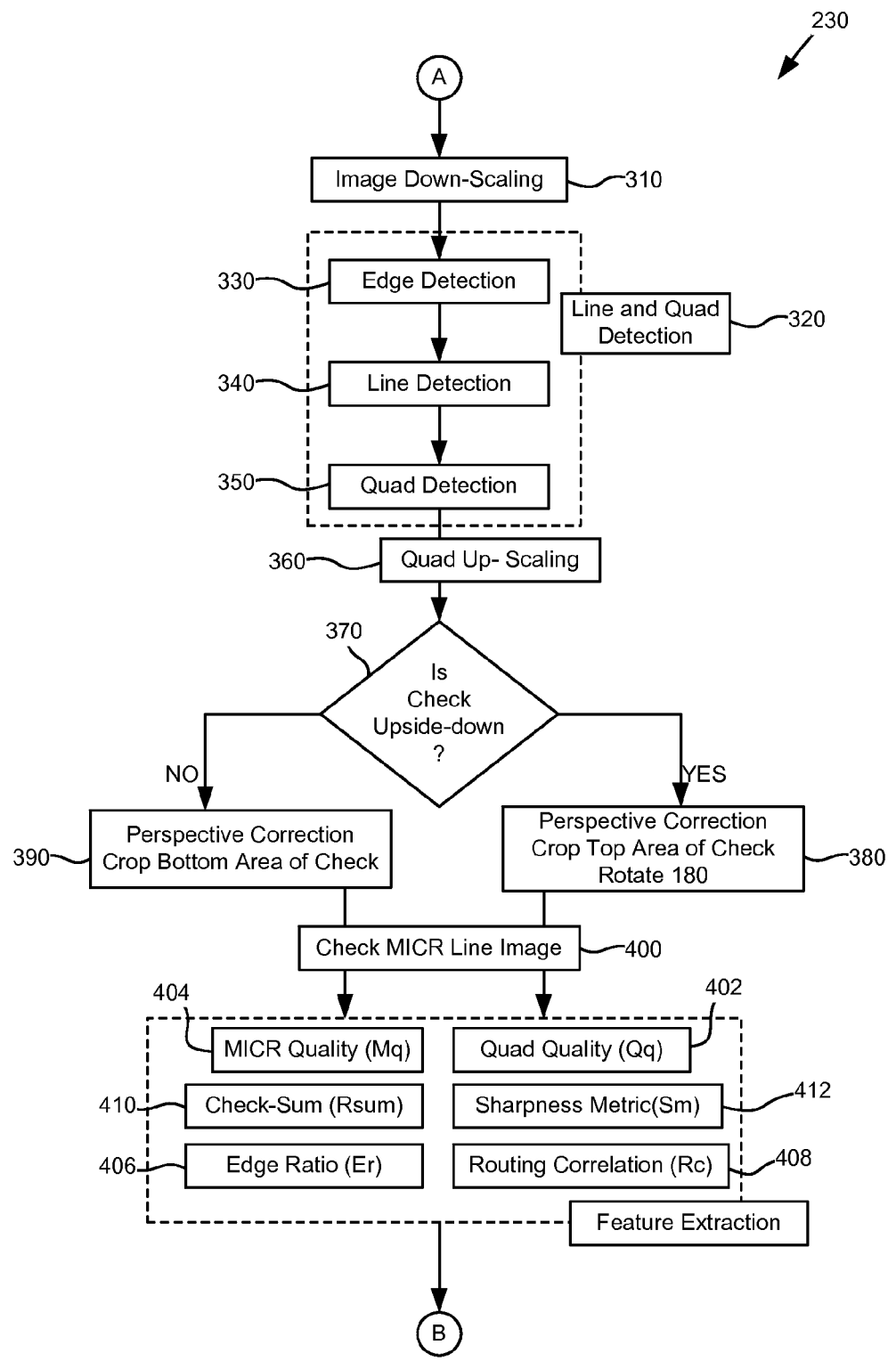

Upon receipt, the controller executes 230 the quality measurements of FIG. 3B. If the frame of the video meets the requisite quality at 240, the image of the check 165' in the frame under consideration is captured 250 and cropped 155 for further processing, such as the transfer or deposit of funds. On the other hand, if the quality of the frame under consideration does not pass its quality test, the controller receives for processing 270 bits 220' from another frame of the video sequence 200 (frame 210-7, in this instance). The process repeats until a frame of the video sequence can meet/exceed the quality measurements of FIG. 3B, or until timed out, such as with the closing of the application or upon reaching some predetermined time.

With reference to FIG. 3B, the quality assessment 230 of a frame of the video assessment begins first with optionally scaling down the image size, 310. This can occur by changing resolution of the image or adjusting the height and width of the field of view taken in by the camera, for example.

At 320, line and quadrilateral detection occurs for the image of the check. This includes detecting image edges 163' (FIG. 2) around the boundary of the check. A Sobel edge detector, for example, is sufficient in this regard. A Hough transform (or similar) is then applied to the edge image to extract a number of straight lines 340 that have the highest votes. As seen in FIGS. 4A-4D, these lines 185, 187, 189, 191, are then used to form a series of candidate quadrilaterals (quads) 193, 193', 193", 193'" that represent possible borders of the image of the check 165'. To narrow down the search for the best quadrilateral 350 some heuristics about the desired shape of check quadrilaterals are used. For example aspect ratio, the angle between facing sides (e.g., lines 185, 187), the angle between adjacent sides (e.g., lines 185, 189), minimum and maximum allowed dimensions of a check, and the perimeter of the quadrilateral are identified and evaluated.

Once a candidate quadrilateral is selected as the best candidate 193'", for example as best matching the check boundary 163', its four corners are then computed to find a perspective transformation. This transformation is needed to correct for camera perspective distortion, such as may occur from the manner in which the user faces the camera toward the check. As seen in FIG. 2, a user may not orient the mobile device 16 planarly with respect to a check 165 laying flat in an x-y plane, thus introducing possible distortion into the image of the check 165'.

Figure 5A:
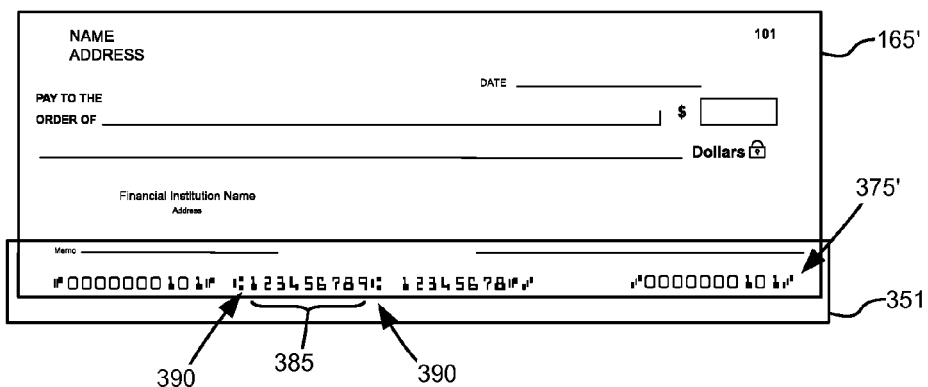
FIGS. 5A and 5B are diagrams of an orientation of an image of a check, including noting a location of a MICR line.
Figure 5B:
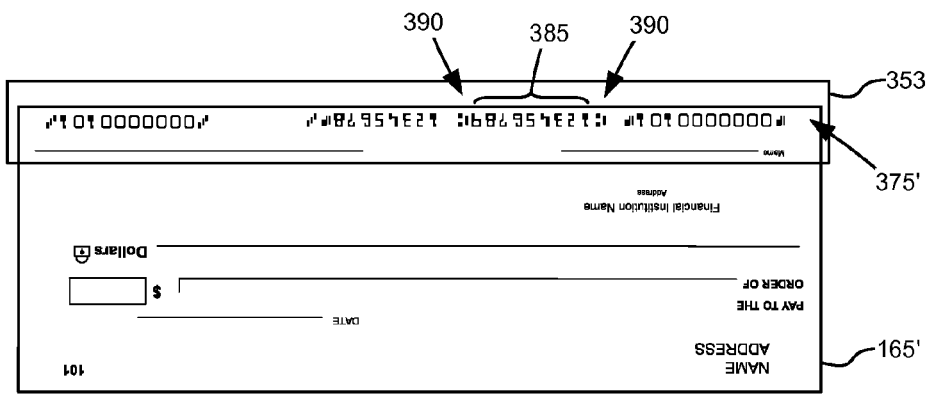

Yet, only two portions of the image of the check 165' (the bottom 351, FIG. 5A and top 353, FIG. 5B) need to be cropped and corrected for perspective distortions during a next phase of processing. That is, these are the areas of the image that are likely to contain the MICR line 375 of the check and its corresponding image of the MICR line 375'. The basic assumption is: if the detected quadrilateral 193 truly represents the best boundary 163' of a check, the subsequent operations to crop and correct for perspective distortion should lead to a MICR image that has MICR line therein having a minimum geometric distortion. Otherwise, the more the detected quadrilateral deviates from the correct boundary of the check, the more the distortion to the MICR image. (The rectangles noted for the bottom and top of the image of the check typically encompass about 20% of the check. For efficiency, the algorithmic process usually alternates checking the bottom and top regions of the check on each assessment until it believes the MICR line may have been detected, at which point the process focuses on a single region, either the top or bottom.)

At 360, the rectangular area 351, 353 is assumed to have the image of the MICR line and is then scaled to a predefined height. As will be seen below, this scaling turns elements of the MICR line, including the routing transit symbols 390 and its delineation of digits 0-9 making up the routing transit numbers 385, into dimensions similar to dimensions of stored templates for the routing transit symbols and numbers to which they will be compared. This speeds processing by making easier the template matching process. At 370, a proper orientation of the image of the check is noted as users would read it from left-to-right and either the selected top or bottom 353, 351 becomes cropped for processing and rotated or not depending upon whether the image of the check is upside-down 380 or not 390. (Alternately, the image need not be rotated as stored templates of the elements of the MICR line could be rotated.)

A series of measurements are next used at 400 to evaluate the quality of the image of the check for ultimate capture and cropping thereof. To quantify quality, the following measurements are taken: 1) Quad quality (Qq) 402; 2) MICR quality (Mq) 404; 3) Edge ratio (Er) 406; 4) Routing correlation (Rc) 408; 5) Routing checksum (Rsum) 410; and 6) Sharpness metric (Sm) 412. They are as follows.

Figure 4A:
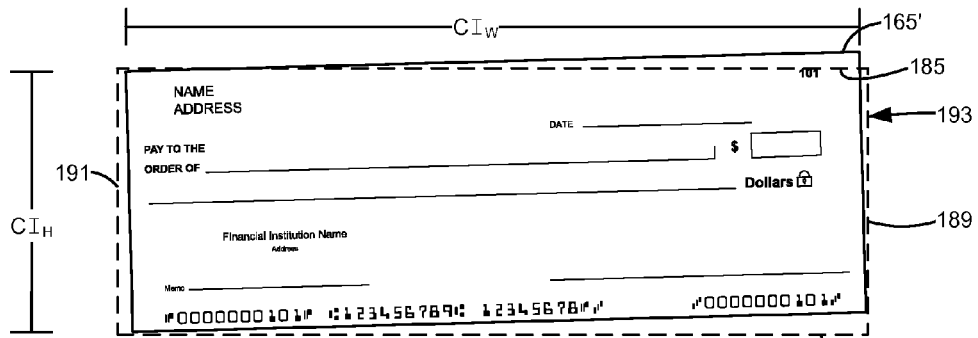
FIGS. 4A-4D are diagrams of possible quadrilaterals about an image of a check.
Figure 4B:
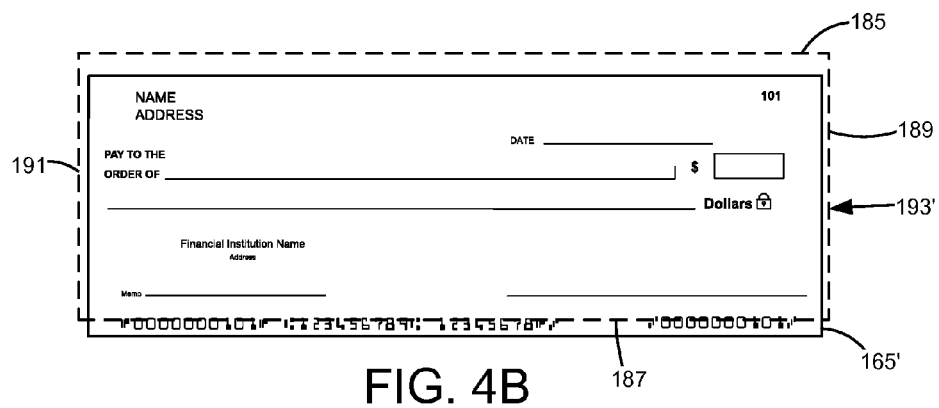
Figure 4C:
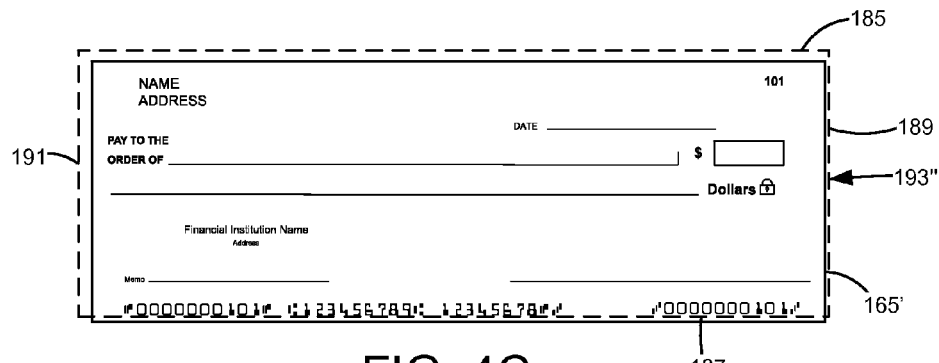
Figure 4D:
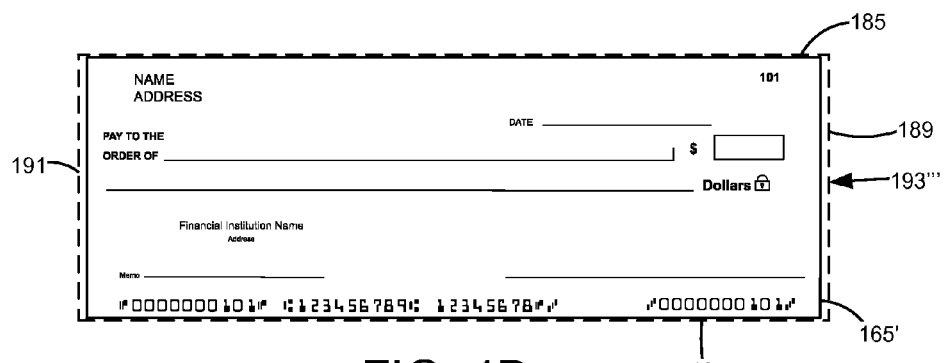
Figure 6:
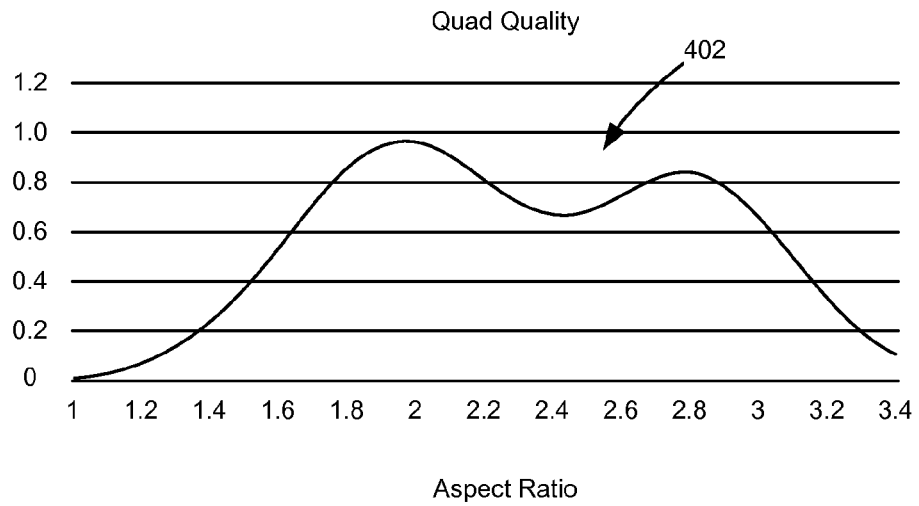
FIG. 6 is a graph denoting the quality of a quadrilateral.

With reference to FIG. 6, the quality of the quadrilateral 193 (FIGS. 4A-4D) can be represented graphically as a function 402 of the aspect ratio of an image of the check 165'. As seen in FIG. 4A, the check image 165' has a check image width and check image height. Its aspect ratio $r=CI_W/CI_H$ is noted for having a relatively high quality Qq 402 with aspect ratios around 2.0 and 2.9, and ranging from about 1.7 to 3.1, whereby a value of Qq≥0.7 represents a valid aspect ratio of a check meeting a first of the quality assessments according to:

$$Q_q = 0.95 e^{\left(-\frac{(r-2.0)^2}{0.245}\right)} + 0.8 e^{\left(-\frac{(r-2.9)^2}{0.18}\right)} \qquad \text{(Eqn. 1)}$$

Figure 7:
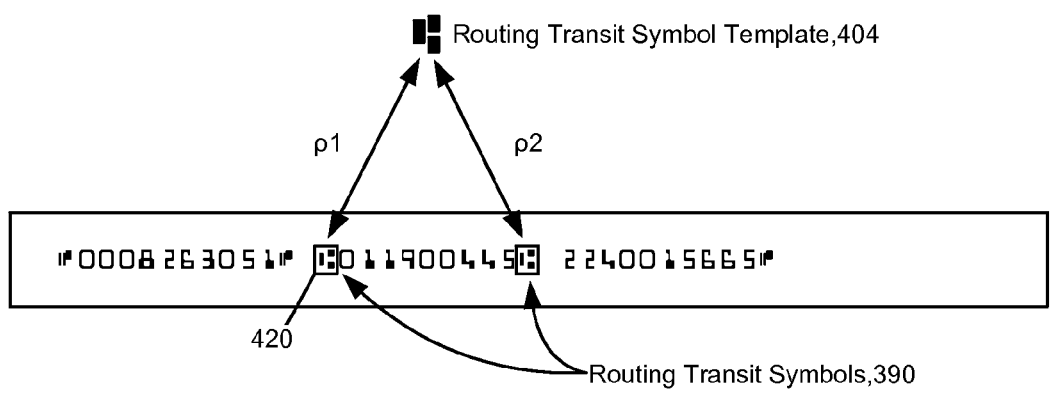
FIG. 7 is a diagram of routing transit symbols from an image of a check for comparison to templates of routing transit symbols.

With reference to FIG. 7, the routing transit symbols 390 of the check are defined in banking terms as the MICR E-13B transit character (Unicode value U+2446), graphically ⑆. They delineate the routing transit numbers on the MICR line of the check and its corresponding image. The computing application stores image templates 404 of the routing transit symbols on the mobile computing device and compares each the routing transit symbols found on the image of the check to the templates. The MICR quality (Mq) 404 measures the strength of the correlation between the symbols found on the image and the templates. The MICR quality (Mq) be computed, for example, as the minimum of the two correlation scores, $\rho_1$ and $\rho_2$, of the transit symbol template and the two real symbols of the check as:

$$M_q = MIN(\rho1, \rho2) \qquad \text{(Eqn. 2)}$$

A minimum or worst match between either of the two routing symbols and the template is selected thus ensuring that if the worst match meets sufficient quality assessments, then so too does the best match between the other of the two routing symbols and the template. U.S. Pending patent application Ser. No. 14/266,057, filed Apr. 30, 2014, entitled "Augmented Image Correlation," provides further details of correlation techniques. Its entire disclosure is incorporated herein by reference.

Figure 8:
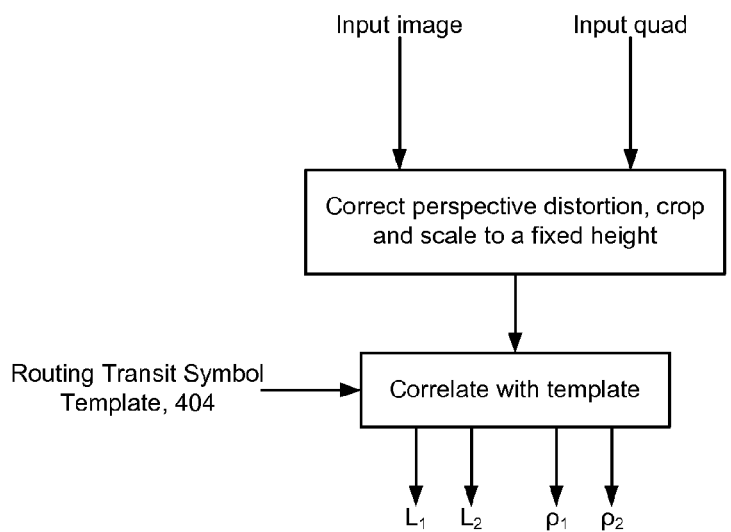
FIG. 8 is a diagram of computing template correlation.

A bounding box 420 is also circumscribed about each of the routing transit symbols in the image. Calculations are then made to determine an (x, y) grid position coordinate for each of the upper left corners, L1(x, y), L2(x, y) of the two boxes as shown in FIGS. 8 and 9.

Figure 9:
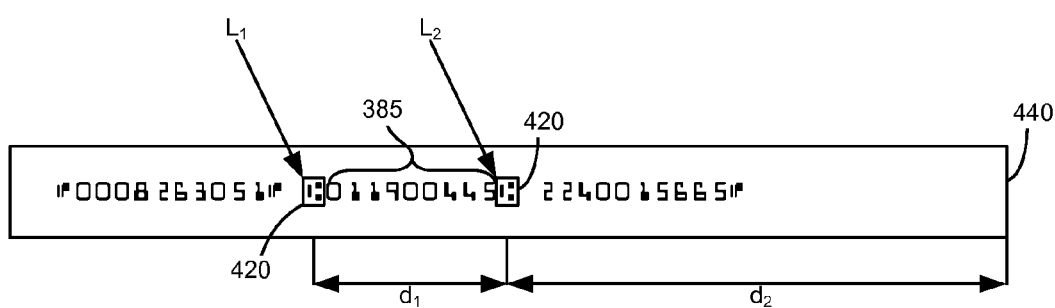
FIG. 9 is a diagram of various distances from an image of a check for computing an edge ratio.

With reference to FIG. 9, the application determines a first distance ($d_1$) from one of the routing transit symbols to the other of the routing transit symbols and a second distance ($d_2$) from one of the routing transit symbols to an edge 440 of the check. To assist in this calculation, the distances are also computed by location vectors L1 and L2 of the matched routing transit symbols. Typically, $d_1$ is the distance (L1–L2), approximately 1.25 inches, and $d_2$ is calculated from the right-most routing transit symbol (as oriented for viewing by the user) to the right edge 440 of the check, approximately 4.4 inches. In turn, the next quality assessment is defined as the Edge ratio (Er) 406 and follows:

$$Er = d_1/d_2 \qquad \text{(Eqn. 3)};$$

where Er is considered valid for ranges from about 0.275 to 0.3.

Next, the values of the routing transit numbers are determined. The numbers 385, FIGS. 5A, 9, in the image of the check, are required values on a valid check. They are nine digits long and range in whole numbers from 0-9, as is known. A quality assessment for Routing correlation (Rc) 408 is given as:

$$R_c = \frac{1}{9} \sum_{i=1}^{9} pi \qquad \text{(Eqn. 4)}$$

and

Rc ranges from 0 to 1.0.

Figure 10:
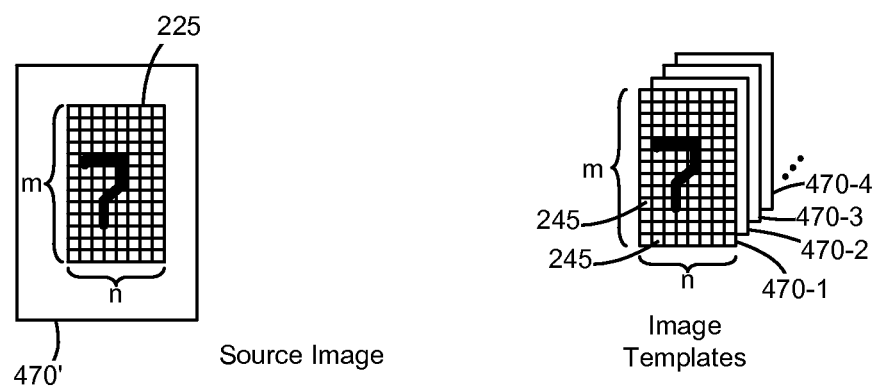
FIG. 10 is diagram for comparing source images of routing transit numbers to templates of digits.

With reference to FIG. 10, each of the values of the routing transit number from the source image 470' are compared to one of ten image templates 470-1, -2, . . . -10 (corresponding to digits 0-9) of image values (a comparison of the digit 7 being noted in this instance as between pixels 225 of the source and 245 of the image in an (m×n) array of pixels as noted in U.S. Pending patent application Ser. No. 14/266,057, for example). A highest score between the source image and the best-matching image template represents the value of the digit and all nine digits are calculated to obtain the routing transit number.

Once known, a Routing checksum (Rsum) 410 is calculated. Rsum is a Modulo 10 of weighted sum of recognized digits D1–D9 in the routing transit number, given as:

$$R_{sum} = \text{mod}(S, 10),$$

where $$S = 3(D1+D4+D7)+7(D2+D5+D8)+(D3+D6+D9) \qquad \text{(Eqn. 5)}$$

If all digits in the routing transit number are recognized correctly, then Rsum=0, otherwise Rsum≠0. For a routing transit number of 0 1 1 9 0 0 4 4 5, FIG. 7, for example, Rsum=0 and S is valid since it equals 80 (a factor of 10).

Figure 11:
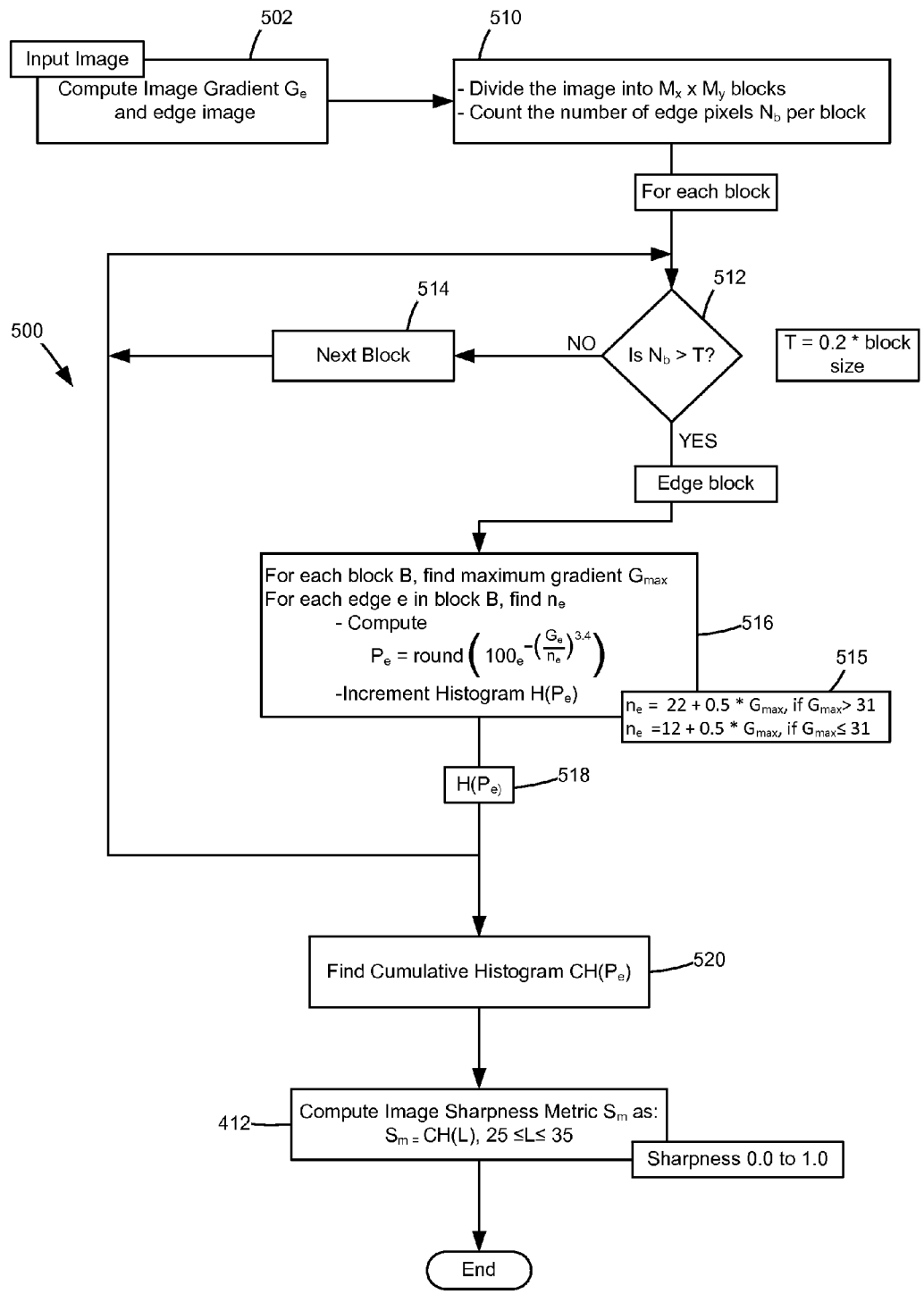
FIG. 11 is a flow chart of a possible assessment of sharpness of an image of a check.

With reference to FIG. 11, the quality assessment for a Sharpness metric (Sm) 412 seeks a statistical measurement to estimate how probable that an image of check is focused well by the camera. In a method 500 similar to Narvekar, N. D.; Karam, L. J., "A No-Reference Image Blur Metric Based on the Cumulative Probability of Blur Detection (CPBD)," Image Processing, IEEE Transactions on, vol. 20, no. 9, pp. 2678-2683, September 2011, a sharpness metric is calculated. Our sharpness is a function of image gradient 502 and it is more suitable for document images. The sharpness of the reference algorithm is a function of the edge width and it is more suitable to natural images. From the image, pluralities of blocks are created 510. Its edge pixels are noted. Then, for each block, the edge pixels are compared to T, which is 0.2 times the size of the block, to see if $N_b > T$, 512. If not, the next block is analyzed 514. If yes, each block B has its maximum gradient discovered and $n_e$ is computed at 515. The probability $P_e$ is computed there from at 516 and histogram $H(P_e)$ is incremented 518. The cumulative histogram $CH(P_e)$ is noted at 520 and the sharpness metric Sm computed at 412. It ranges from 0.0 to 1.0.

Based on the foregoing quality assessments, the following example notes the automatic capture of an image of a check or not, while providing a color coded feedback to the user. For example, if Qq<0.7, Mq<0.5, Er<0.275 or Er>0.3, Sm<0.5, Rc<0.5 and Rsum≠0, a red quadrilateral 193 is overlaid on top of the image of the check 165' to show the user that the quality is not yet sufficient to capture or crop the image. If, however, Qq>0.7, Mq>0.5, Er≥0.275 and Er≤0.3, Sm>0.5, Rc>0.5 and Rsum≠0, a yellow quadrilateral is overlaid on top of the image to show that the quadrilateral is a strong candidate but it needs more iterations to get Rsum=0. If this yellow state stayed for a longer time or the number of maximum trials has been reached, a dialog box could be shown to the user to either proceed with this capture or to start over. Still further, if Qq≥0.7, Mq≥0.5, Er≥0.275 and Er≤0.3, Sm≥0.5, Rc≥0.5 and Rsum=0, a green quadrilateral is overlaid on top of the image of the check to show the user that the computing application is ready to automatically capture and crop the image from the video sequence, without user intervention.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments. All quality assessments made herein need not be executed in total and can be done individually or in combination with one or more of the others.

The invention claimed is:

1. A method for automatically capturing an image of a check from a video sequence of images of the check without user selection, the video sequence having a plurality of frames, comprising:
    determining an aspect ratio of the check;
    finding in a single frame of the plurality of frames of the video sequence both routing transit symbols that delineate a routing transit number on a magnetic ink character recognition (MICR) line of the check;
    matching to a template each of the routing transit symbols;
    determining a first distance from one of the routing transit symbols to the other of the routing transit symbols and a second distance from said one of the routing transit symbols to an edge of the check;
    calculating a ratio of the first distance and the second distance;
    comparing each digit of the routing transit number to templates of digits to determine values of the routing transit number;
    capturing the image of the check from the single frame; and
    determining if the aspect ratio, a worst match of the matching to the template, the ratio of the first and second distances, and the comparing said each digit of the routing transit number fall within a predetermined range of acceptable values before said capturing the image of the check from the single frame.

2. The method of claim 1, further including cropping the check from the single frame, including eliminating background pixels.

3. The method of claim 1, further including assessing stability of the video sequence.

4. The method of claim 1, further including receiving for processing another frame of the video sequence.

5. The method of claim 1, further including determining an orientation of the check in the single frame.

6. The method of claim 5, wherein the finding said both routing transit symbols occurs relative to only a bottom or top portion of the check depending on said orientation.

7. The method of claim 5, further including rotating the check for a user to view from left-to-right if the orientation of the check is upside-down as users read from left-to-right.

8. The method of claim 1, further including calculating a checksum of the routing transit number.

9. The method of claim 1, further including calculating a sharpness of the image of the check in the single frame.

10. The method of claim 1, further including calculating a possible bounding border of the check in the single frame.

11. The method of claim 10, further including displaying to a user the possible bounding border with color-coding according to a calculated quality of the possible bounding border.

12. The method of claim 1, wherein the comparing said each digit of the routing transit number to the templates of digits to determine values of the routing transit number further includes comparing said each digit of the routing transit number to templates of digits ranging from values 0 to 9 and selecting a best matching image template therefore.

13. The method of claim 1, further including calculating an image width to an image height of the check in the single frame to said determine the aspect ratio, wherein an acceptable range of aspect ratios ranges from about 1.7 to about 3.1.

14. The method of claim 1, wherein the determining said first and second distances further includes determining an (x, y) position coordinate of a bounding box about said both routing transit symbols.

15. The method of claim 14, further including determining said first and second distances from said (x, y) position coordinate of the bounding box about said both routing transit symbols.

16. The method of claim 8, wherein the calculating the checksum further includes executing a Modulo 10 of weighted sums of the determined values of the routing transit number.

* * * * *